United States Patent [19]

Bimbot et al.

[11] Patent Number: 5,469,529
[45] Date of Patent: Nov. 21, 1995

[54] PROCESS FOR MEASURING THE RESEMBLANCE BETWEEN SOUND SAMPLES AND APPARATUS FOR PERFORMING THIS PROCESS

[75] Inventors: Frédéric Bimbot, Fontenay-Aux-Roses; Luc Mathan, Lannion, both of France

[73] Assignee: France Telecom Establissement Autonome De Droit Public, Paris, France

[21] Appl. No.: 124,005

[22] Filed: Sep. 21, 1993

[30] Foreign Application Priority Data

Sep. 24, 1992 [FR] France .................................. 92 11406

[51] Int. Cl.$^6$ ................................ G10L 5/06; G10L 9/00
[52] U.S. Cl. .................... 395/2.55; 395/2.4; 395/2.48; 395/2.52; 381/41
[58] Field of Search ................ 381/41–43; 395/2, 395/2.4, 2.6–2.61, 2.64, 2.65, 2.66, 2.79, 2.86

[56] References Cited

U.S. PATENT DOCUMENTS

| | | | |
|---|---|---|---|
| 4,181,821 | 1/1980 | Pirz et al. | 395/2.61 |
| 4,718,088 | 1/1988 | Baker et al. | 381/43 |
| 4,837,830 | 6/1989 | Wrench, Jr. et al. | 381/42 |
| 5,072,452 | 12/1991 | Brown et al. | 395/2.65 |
| 5,168,524 | 12/1992 | Kroeker et al. | 381/43 |
| 5,293,584 | 3/1994 | Brown et al. | 395/2.86 |
| 5,333,236 | 7/1994 | Bahl et al. | 395/2.65 |

OTHER PUBLICATIONS

Speech Communication, vol. 8, No. 1, 1989, pp. 35–44, A. Cohen, et al., "On Text Independent Speaker Identification Using A Quadratic Classifier With Optimal Features".

ICASSP 90, vol. 1, Apr. 3, 1990, pp. 289–292, H. Gish, "Robust Discrimination in Automatic Speaker Identification".

*Primary Examiner*—David K. Moore
*Assistant Examiner*—Tariq Hafiz
*Attorney, Agent, or Firm*—Oblon, Spivak, McClelland, Maier, & Neustadt

[57] ABSTRACT

A process and apparatus for measuring the resemblance between sound samples incorporating a learning phase and a test phase, each having a digital acquisition and preprocessing stage, an order p acoustic analysis stage and a p×p covariance matrix calculating stage with respect to the resulting vector signal, the learning phase also having a reference X covariance matrix inversion stage and a stage of storing the thus obtained matrix $X^{-1}$ in a dictionary, the test phase incorporating a stage of multiplying the covariance matrix of test Y with the reference matrix $X^{-1}$, a stage of extracting all or part of the p eigenvalues $\lambda k$ of said matrix product and a calculating stage using a family of functions f, called generalized sphericity functions, so as to obtain a digital value measuring the resemblance between the considered test sample and the reference samples of the dictionary. Alternative implementations are also described, which advantageously allow the same result to be obtained without requiring the explicit calculation of eigenvalues.

12 Claims, 3 Drawing Sheets

PROCESS FOR MEASURING THE RESEMBLANCE BETWEEN SOUND SAMPLES AND APPARATUS FOR PERFORMING THIS PROCESS

DESCRIPTION

TECHNICAL FIELD

The present invention relates to a process for measuring the resemblance between sound samples and to an apparatus for performing this process.

PRIOR ART

The field of the invention is that of the automatic recognition of a person who is speaking or speaker. This field is a field of artificial intelligence, where the performance characteristics of the machine can be better than human performance characteristics. In the case of a short emission and a large number of speakers, the learning time for recognizing a new voice is very long for a man as compared with a machine.

The automatic recognition of speakers consists of developing an automatic system able to discriminate a speaker from among many speakers as a function of his voice. A distinction can be made between two types of tasks, namely speaker identification and speaker verification. For both of these, a calculation is made of the resemblance between two sound samples. One of these is called the reference sample and is usually available in preprocessed, prestored form in a dictionary. The other, called the test sample, is intended to be classified.

The speaker identification process consists of classifying an unknown speech sample as belonging to one from among N reference speakers (N possible decisions). The speaker verification process consists of deciding whether an unidentified sound sample belongs to a particular reference speaker, where two decisions are possible, namely yes or no. The speaker identification process may not be restricted to the N reference speakers. There can also be the case where the test sample does not belong to any of the reference speakers. There are then N+1 possible decisions, namely one among N speakers, or rejection.

There are numerous prior art documents relating to speaker recognition processes. The closest to the present invention is described in an article by Herbert GISH entitled "Robust Discrimination In Automatic Speaker Identification" (IEEE 1990, pp. 289–292), in which is described the principle of using eigenvalues of a product of two covariance matrixes. However, the measurements proposed are not sphericity measurements (cf. particularly paragraph IV of this Article). The major disadvantage of said process is that it is very expensive with regards to the calculating time.

A Doctor of Engineering thesis of Yves GRENIER entitled "Identification du locuteur et adaptation au locuteur d'un système de reconnaissance phonémique" (presented to the Ecole Nationale Supérieure des Télé-communications, 27.10.1977) describes a speaker recognition process, where use is made of a maximum plausibility criterion based, like the GISH process, on the extraction of proper eigenvalues. This process gives good results, but the author stresses the slowness of the processing.

The present invention is directed at a process for measuring the resemblance between several sound samples which, compared with the prior art processes, has better performance characteristics for a much shorter processing time.

DESCRIPTION OF THE INVENTION

The present invention proposes a process for measuring the resemblance between several sound samples comprising a learning phase from one or more reference sound samples, and a test phase from one or more test sound samples, said learning and test phases each incorporating a digital acquisition and preprocessing stage for the considered sound sample, a pth order acoustic analysis stage and a stage of calculating the covariance matrix of size p×p of the resulting vector signal, the learning phase also incorporating a stage of inverting the test covariance matrix X and a storage stage of the thus obtained matrix $X^{-1}$ in a dictionary, the test phase having a stage of multiplying the covariance matrix of test Y with the inverted reference matrix $X^{-1}$, an extraction stage with respect to all or part of the proper p eigenvalues $\lambda k$ of said matrix product $YX^{-1}$, characterized in that the test phase also comprises a calculating stage using a family of functions f, called generalized sphericity functions, applied to said eigenvalue $\lambda k$, so as to obtain a digital value measuring the resemblance between the considered test sample and the reference sample or samples of the dictionary, said value being usable for taking a decision on the classification of said test sample and in that said functions f are combinations of at least two of the following terms:

$$a(\lambda_1, \lambda_2, \ldots, \lambda_p) = \frac{1}{p} \sum_{k=1}^{p} \lambda_k$$

$$g(\lambda_1, \lambda_2, \ldots, \lambda_p) = \sqrt[p]{\prod_{k=1}^{p} \lambda_k}$$

$$h(\lambda_1, \lambda_2, \ldots, \lambda_p) = \left( \frac{1}{p} \sum_{k=1}^{p} \frac{1}{\lambda_k} \right)^{-1}$$

a, g and h representing respectively the arithmetic, geometric and harmonic mean values of the eigenvalues $\lambda k$.

Advantageously, in a first variant, use is made of the trace of the matrix $YX^{-1}$:

$$\sum_{k=1}^{p} \lambda_{k_i} = \text{trace}(YX^{-1})$$

the determinant of said matrix:

$$\prod_{k=1}^{p} \lambda_{k_i} = \det(YX^{-1})$$

and the trace of the inverted matrix $YX^{-1}$:

$$\sum_{k=1}^{p} \frac{1}{\lambda_k} = \text{trace}(XY^{-1})$$

without having to explicitly calculate the eigenvalue $\lambda k$.

Advantageously, in a second variant, storage takes place in the dictionary not only of the covariance matrices X, but also their inverse $X^{-1}$, the matrix Y being inverted during the test and direct calculation takes place of the trace of the product of two symmetrical matrices A and B:

$$\text{traceprod}(A,B) = \text{trace}(AB) = \sum_{i=1}^{p} \sum_{j=1}^{p} a_{ij}b_{ji} =$$

$$\sum_{i=1}^{p} a_{ii}b_{ii} + 2 \cdot \sum_{i=1}^{p-1} \sum_{j=i+1}^{p} a_{ij}b_{ij}$$

This calculation applies to the product of Y by $X^{-1}$ and to the product of X by $Y^{-1}$. An operation as a function of these two numbers produces the sought measurement. This calculation makes it possible to speed up the processing times when only the terms a and h are involved.

In the calculating stage, use can advantageously be made of a function such as:

$$\text{traceprod}(Y,X^{-1}) \cdot \text{traceprod}(X,Y^{-1}) = a/h$$

The invention also relates to an apparatus using the above process and which comprises:
- a digital acquisition and proprocessing module,
- an acoustic analysis module,
- a covariance matrix calculating module,
- a matrix inversion module,
- a module for storing in a dictionary,
- a matrix multiplication module,
- a module for extracting eigenvalues,
- a module for calculating a resemblance signal.

Advantageously, in the first variant, said apparatus has a module for calculating the trace of a matrix $YX^{-1}$ in parallel with a module for calculating the determinant of said matrix, a module for inverting said matrix followed by a module for calculating the trace of the thus obtained matrix.

Advantageously, in the second variant, it comprises two modules for calculating the trace of a product (traceprod) of two matrices, followed by a product calculating module.

The process and apparatus according to the invention have numerous advantages and in particular a considerable robustness with respect to the independence of the text spoken (the system having no need to know the linguistic content of the test sample) and a considerable apparatus simplicity, both as regards to the creation or updating of the reference sound sample dictionary and that of performing a test.

In its most general form, the process according to the invention makes it possible to obtain a very good efficiency of the result. In variants, the invention also makes it possible to bring about a great performance simplicity, both with regards to the creation and updating of the reference sound sample dictionary, and that of the performance of a test, whilst leading to a high calculating speed.

DETAILED DESCRIPTION OF EMBODIMENTS

The process according to the invention comprises a first learning phase during which the collected sample or samples are reference sound samples, and a test phase during which the collected sample or samples are test sound samples.

Figure 1:
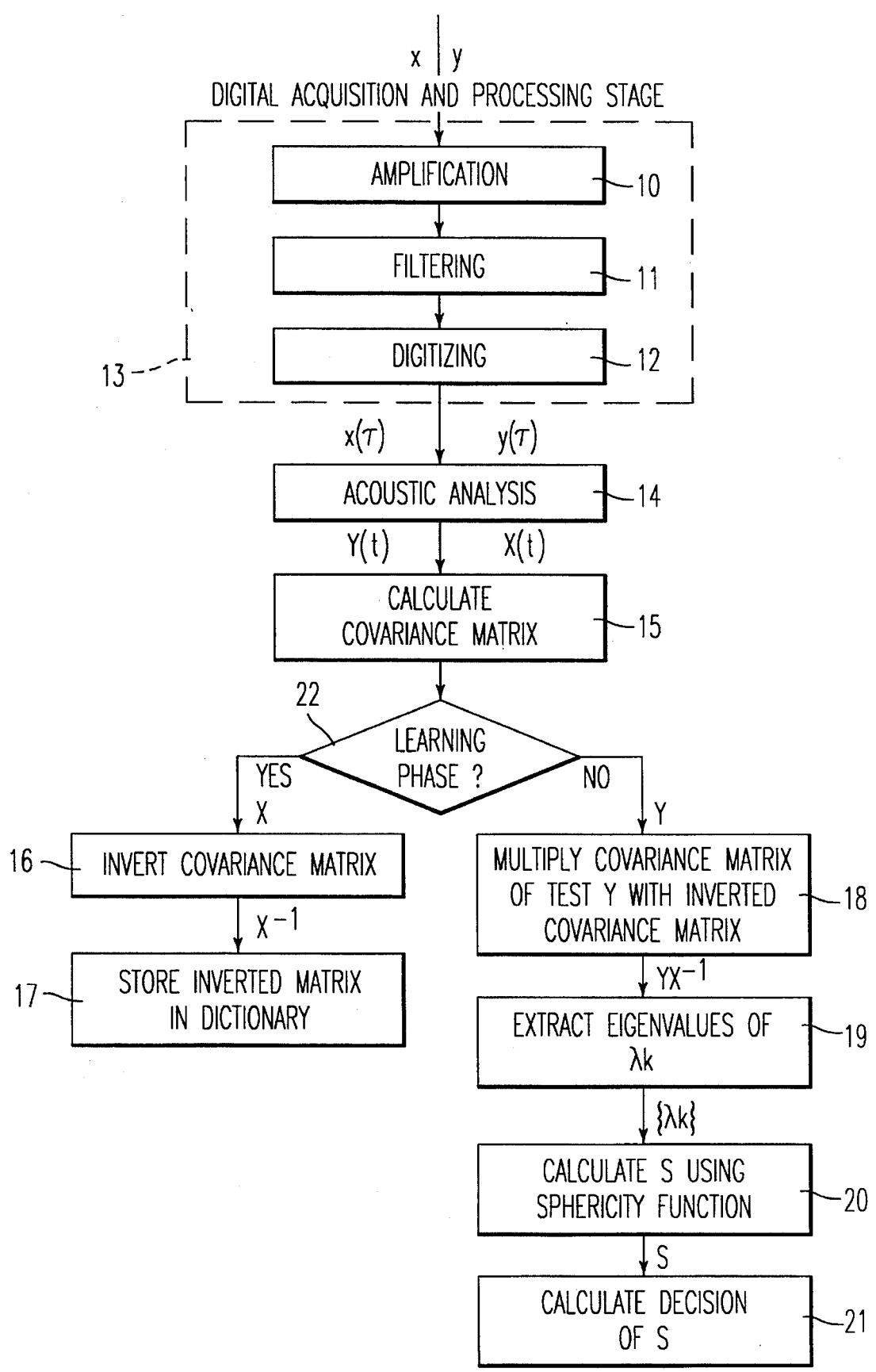
FIG. 1 Illustrates the process according to the invention.

As shown in FIG. 1, these learning and test phases in each case involve a digital acquisition and preprocessing stage 13 incorporating amplifications 10, filtering 11 and digitizing 12 stages of the considered sound sample, followed by a pth order acoustic analysis stage 14 and a stage of calculating the covariance matrix 15 of size p×p of the resulting vector signal.

The learning and test phases are then distinguished with the aid of test 22 replying to the question as to whether it is a learning phase. The learning phase also comprises a stage 16 of inverting the covariance matrix 6 and storing 17 the thus obtained reference matrix $X^{-1}$ in a dictionary.

The test phase comprises a stage 18 of multiplying the covariance matrix of test Y with the reference matrix $X^{-1}$, a stage 19 of extracting all or part of the p eigenvalues $\lambda k$ of said product of matrix $YX^{-1}$. It also comprises a calculation stage 20 using a family of functions f, called generalized sphericity functions, applied to said eigenvalues $\lambda k$, so as to obtain a digital value S measuring the resemblance between the considered test sample and the reference samples of the dictionary, whereby said value S can be used in the module 21 for taking a decision concerning the classification of said test sample.

The signal processing process thus makes it possible to compare a test sample $y(\tau)$ with a reference sample $x(\tau)$, which is coded, compressed and stored and which is obtained from a reference sample dictionary.

Thus, a calculation takes place of a function of the eigenvalues of the matrix $YX^{-1}$, in which Y and X are covariance matrices of all or part of the vector signal resulting from an acoustic analysis (in the wider sense of the term), said analysis being carried out on the monodimensional signals $y(\tau)$ and $x(\tau)$. The acoustic analysis is an extraction, at regular or irregular intervals, of shortterm characteristics of the signals $y(\tau)$ and $x(\tau)$, optionally followed by a normalization by longterm characteristics of said signals or by factors independent of said signals. The variable t represents the selection times of the acoustic parameters.

Thus, from the sampled monodimensional signal $y(\tau)$ is obtained a multidimensional signal Y(t) of length T and with p components (p being the acoustic analysis dimension, e.g. the order of a LPC module). This signal can be represented as a matrix [Y(t)] with p rows and T columns whose ith component at time t will be Yi(t). The covariance matrix Y is then obtained by the following calculation $Y = [Y(t)][Y(t)]^T$, whose element with the index ij is calculated by $$Y_{ij} = \sum_{t=1}^{T} Y_i(t)Y_j(t).$$

The thus calculated matrix Y is symmetrical (and positive definite). If appropriate, it can then undergo all types of normalizations. This calculation is naturally identical for $x(\tau)$.

It is pointed out that the eigenvalue $\lambda$ (and the associated eigenvectors b)) of a matrix M are solutions of the equation: $Mb = \lambda b$, in which the unknowns are $\lambda$ and b. $\lambda k$ applies to the eigenvalues of the matrix $YX^{-1}$.

The idea of using a function f of the eigenvalues of $YX^{-1}$ as the resemblance measurement is not new and in particular appears in the aforementioned publication by GISH in the form of a calculation of a probability ratio. An essential characteristic of the invention consists of using a certain family of functions f, called generalized sphericity functions, which are combinations of at least two of the following terms:

$$a(\lambda_1, \lambda_2, \ldots, \lambda_p) = \frac{1}{p} \sum_{k=1}^{p} \lambda_k$$

$$g(\lambda_1, \lambda_2, \ldots, \lambda_p) = \sqrt[p]{\prod_{k=1}^{p} \lambda_k}$$

$$h(\lambda_1, \lambda_2, \ldots, \lambda_p) = \left( \frac{1}{p} \sum_{k=1}^{p} \frac{1}{\lambda_k} \right)^{-1}$$

a, g and h respectively representing the arithmetic, geometric and harmonic mean values of the eigenvalues $\lambda k$, so that $$\lambda_1 = \lambda_2 = \ldots = \lambda_p \Rightarrow a = g = h$$

For $\lambda k$ all positive, we have: a>g>h.

if the matrix $YX^{-1}$ is equal to identity within a multiplicative coefficient, we obtain:

a/h=a/g=g/h=1.

These same sphericity ratios exceed 1 as soon as at least one of the eigenvalues $\lambda k$ differs from the others. Thus, the functions f can be placed in the form:

$$f(\lambda_1, \lambda_2, \ldots, \lambda_p) = F(a(\lambda_1, \lambda_2, \ldots, \lambda_p), g(\lambda_1, \lambda_2, \ldots, \lambda_p), h(\lambda_1, \lambda_2, \ldots, \lambda_p))$$

with F(a,g,h) extremum for a=g=h.

Any function of this family must be looked upon as a generalized sphericity measurement from which it is possible to directly deduce a resemblance measurement between X and Y.

Figure 2:
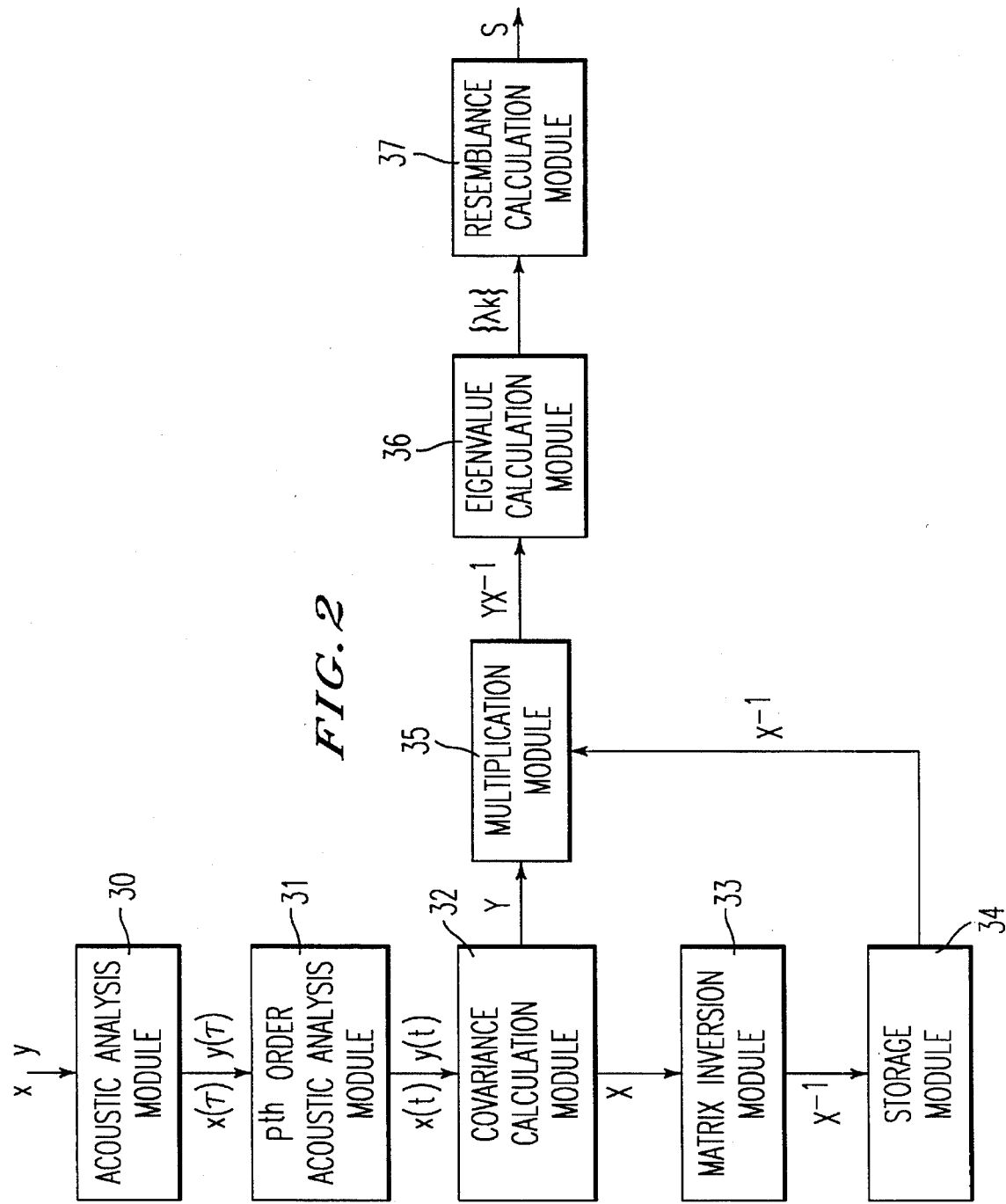
FIG. 2 illustrates an apparatus for performing the process according to the invention.

An example of an apparatus for performing the process according to the invention is shown in FIG. 2 and comprises the following modules:

a module 30 for the acquisition and preprocessing of the different sound samples x and y, a pth order acoustic analysis module 31 for said sound samples, a module 32 for calculating a coveriance matrix (X and Y) of size p×p of the vector signal resulting from the acoustic analysis of different signals, a matrix inversion module 33 for the covariance matrix X, a module 34 for storing the matrix $X^{-1}$ in a dictionary, a module 35 for multiplying matrixes Y and $X^{-1}$, a module 36 for extracting eigenvalues from said matrix product and a module 37 for calculating a resemblance signal S.

The functions a, g and h defined hereinbefore do not require an explicit extraction of the eigenvalues. This is due to the fact that there are matrix invariants by base change. For example, the sum of the eigenvalues of a matrix is equal to its trace (i.e. the sum of its diagonal elements). The product of the eigenvalues is equal to its determinant. Thus, we have the following relations:

$$\sum_{k=1}^{p} \lambda_k = \text{trace}(YX^{-1})$$

$$\prod_{k=1}^{p} \lambda_k = \det(YX^{-1})$$

-continued $$\sum_{k=1}^{p} \frac{1}{\lambda_k} = \text{trace}(XY^{-1})$$

Thus, there are variants of the apparatus according to the invention, which lead to the same result and whose configuration does not explicitly require an eigenvalue extraction module 36. Thus, the module 36 can be replaced by all or part of the modules shown in FIG. 3.

Figure 3:
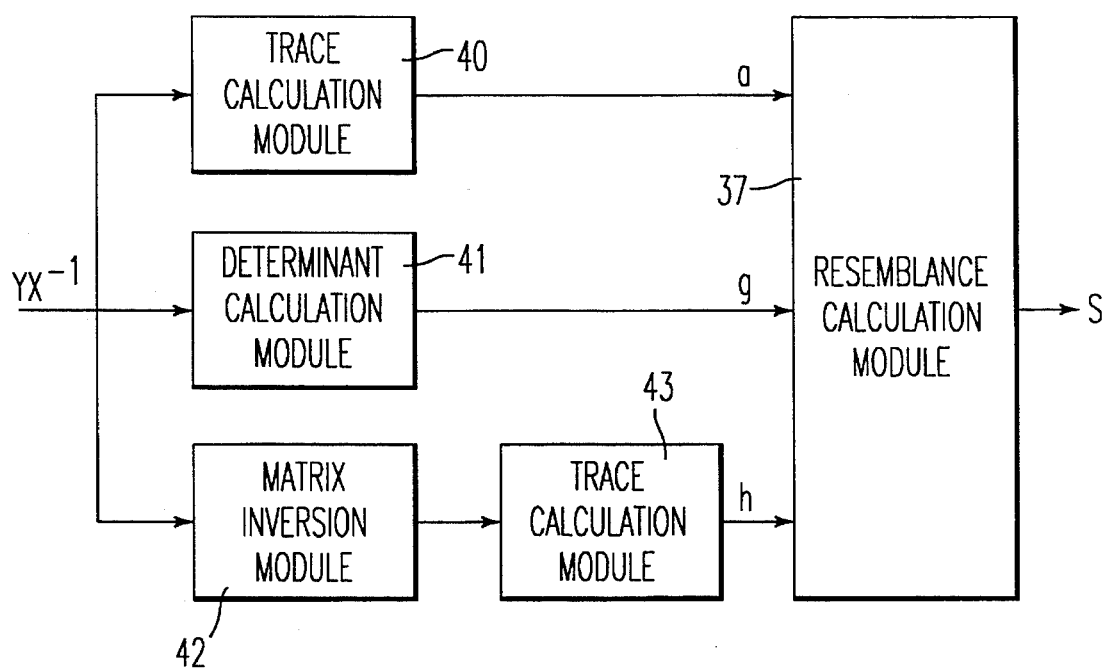
FIGS. 3 and 4 illustrate two variants of the apparatus shown in FIG. 2.

In a first variant shown in FIG. 3, the eigenvalue calculating module 36 is replaced by a module 40 for calculating the trace of the matrix $YX^{-1}$ in parallel with a module 41 for calculating the determinant of said matrix and a module 42 for inverting said matrix followed by a module 43 for calculating the trace of the matrix obtained in this way. Thus, the three terms a, g and h are obtained (to within a factor or power), which then directly contribute to the calculation of the sphericity measurement.

Certain sphericity functions can be realized in an even simpler manner. For example, if the function of the eigenvalues only has the two following terms:

$$\sum_{k=1}^{p} \lambda_k \text{ and } \sum_{k=1}^{p} \frac{1}{\lambda_k},$$

it is merely sufficient to calculate the inverse $Y^{-1}$ of the matrix Y. The eigenvalue calculating module 36 can be replaced by a matrix inversion module (in the circumstances symmetrical) and which is used for trace calculation (sum of the diagonal elements). In this case, for speed reasons, the dictionary also stores the matrixes X, in addition to the matrixes $X^{-1}$. It is then possible to simplify the apparatus by taking advantage of the following property:

$$\text{traceprod}(A,B) = \text{trace}(AB) = \sum_{i=1}^{p} \sum_{j=1}^{p} a_{ij} b_{ji} =$$

$$\sum_{i=1}^{p} a_{ii} b_{ii} + 2 \cdot \sum_{i=1}^{p-1} \sum_{j=i+1}^{p} a_{ij} b_{ij}$$

for A and B symmetrical.

Thus, in a second variant of the apparatus according to the invention, the modules 35, 36 and 37 of FIG. 2 are replaced by two modules 45 and 46 for calculating the trace of the product of the two matrices (symmetrical), followed by a product calculating module 47.

Figure 4:
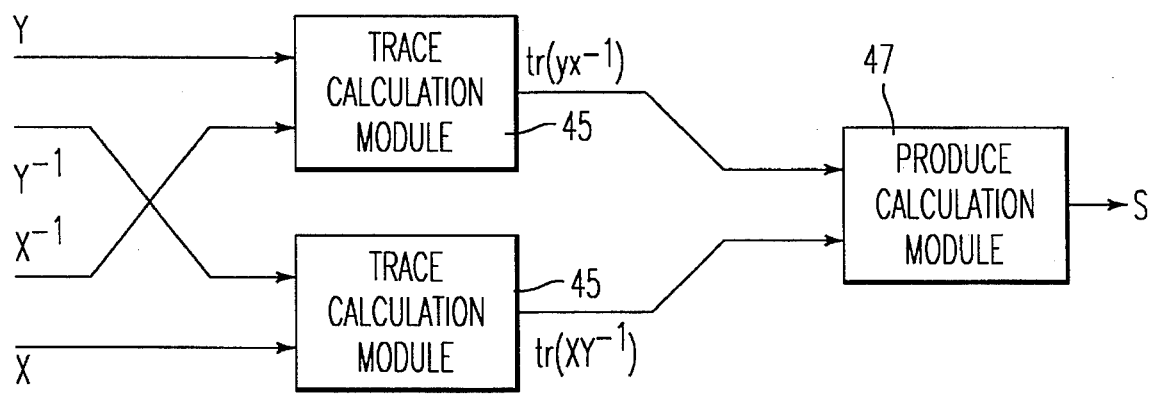

In the dictionary are not only stored the covariance matrixes X, but also their inverse $X^{-1}$. The matrix Y is inverted during the test (this not being shown in FIG. 4). There is a direct calculation of the trace of the product of two symmetrical matrices and an operation as a function of the two numbers, producing the sought measurement (e.g. a multiplication), so that we obtain:

$$\text{traceprod}(Y, X^{-1}) \cdot \text{traceprod}(X, Y^{-1}) = \left( \sum_{k=1}^{p} \lambda_k \right) \cdot$$

$$\left( \sum_{k=1}^{p} \frac{1}{\lambda_k} \right) = p^2 \frac{a}{h}$$

This second variant makes it possible to obtain excellent identification results.

In an embodiment, the result obtained is 97.8% on 2100 independent tests using test samples of average duration 3 seconds and coming from 420 different speakers (5 tests per speaker). The references were calculated for each speaker on a sample lasting on average approximately 15 seconds and having no linguistic link either with the test samples, or with the other reference samples. There is no phrase from the test system in the reference system and all the phrases of the reference system are different. Therefore there is a total independence with respect to the text or linguistic content. When the tests last approximately 15 seconds, the identification rate obtained (still relating to 420 speakers, but a single test per speaker) reaches 99.5%.

Other generalized sphericity functions lead to only scarcely inferior results, e.g., linear combinations of the sphericity ratios ($ah^{-1}$, $ag^{-1}$, $gh^{-1}$) and their random powers. In the same way, the results are quasi-equivalent on replacing the $\lambda k$ by monotone functions of $\lambda k$ (e.g. on replacing $\lambda k$ by its square root). However, it is pointed out that these only constitute variants of the inventive process.

The process according to the invention can be used in numerous applications requiring a selective access, particularly for confidentiality reasons. The apparatus according to the invention then makes it possible to acquire characteristics of the corresponding sound signature and then check the identity.

The following applications are specified:
access control to physical processes: security/industrial protection;
privileged access to information: information centres/data banks;
validation of banking operations and transactions;
allocation of nominative and confidential tasks: use of equipment only to be used for a single person;
domestic applications: protection by electronic lock;
voice recognition: adaptation of a voice recognition system to several speakers;
taleconference: reserved access to members of a meeting, monitoring communications channels.

The field of the invention can be extended to other applications requiring the resemblance measurement between sound samples and in particular acoustic ambience analysis, the recognition of pieces of music, etc.

We claim:

1. A process for measuring a resemblance between a plurality of sound samples, comprising:
 a learning phase comprising the steps of:
  acoustically analyzing a reference sound sample using a $p^{th}$ order acoustical analysis to obtain a resultant vector signal of the reference sound sample;
  calculating a covariance matrix X of size p×p using the resultant vector signal of the reference sound sample;
  inverting said covariance matrix X to obtain an inverted covariance matrix $X^{-1}$; and
  storing the inverted covariance matrix $X^{31\ 1}$ in a dictionary;
 a test phase comprising the steps of:
  acoustically analyzing a test sound sample using a $p^{th}$ order acoustical analysis to obtain a resultant vector signal of the test sound sample;
  calculating a covariance matrix Y of size p×p using the resultant vector signal of the test sound sample;
  multiplying the covariance matrix Y with the inverted covariance matrix $X^{-1}$ to obtain a product $YX^{-1}$;
  calculating p eigenvalues $\lambda k$ of $YX^{-1}$;
  determining a resemblance between the reference sound sample and the test sound sample using generalized sphericity functions using at least two of the following equations:

$$a(\lambda_1, \lambda_2, \ldots, \lambda_p) = \frac{1}{p} \sum_{k=1}^{p} \lambda_k$$

$$g(\lambda_1, \lambda_2, \ldots, \lambda_p) = \sqrt[p]{\prod_{k=1}^{p} \lambda_k}$$

$$h(\lambda_1, \lambda_2, \ldots, \lambda_p) = \left( \frac{1}{p} \sum_{k=1}^{p} \frac{1}{\lambda_k} \right)^{-1}$$

where a, g, and h represent respectively an arithmetic, geometric, and harmonic mean values of the eigenvalues $\lambda k$,
 wherein the learning phase and test phase each further perform the steps of:
 amplifying the sound samples;
 filtering the amplified sound samples; and
 digitizing the filtered amplified sound samples.

2. A process according to claim 1, wherein:
 the learning phase includes the step of collecting the reference sound sample; and
 the test phase includes the step of collecting the test sound sample.

3. A process according to claim 1, wherein the step of determining a resemblance uses the trace of the matrix $YX^{-1}$:

$$\sum_{k=1}^{p} \lambda_k = \text{trace}(YX^{-1})$$

the determinant of the matrix $YX^{-1}$:

$$\prod_{k=1}^{p} \lambda_k = \det(YX^{-1})$$

and the trace of the inverted matrix $YX^{-1}$:

$$\sum_{k=1}^{p} \frac{1}{\lambda_k} = \text{trace}(YX^{-1})$$

without having to explicitly calculate the eigenvalues $\lambda k$.

4. A process according to claim 3, wherein:
 the learning phase further comprises the step of storing the covariance matrix X in the dictionary;
 the test phase calculates the inverse matrix $Y^{-1}$; and
 the test phase directly calculates the trace of a product of two symmetrical matrices A and B according to the equation:

$$\text{traceprod}(A,B) = \text{trace}(AB) = \sum_{i=1}^{p} \sum_{j=1}^{p} a_{ij} b_{ji} = \sum_{i=1}^{p} a_{ii} b_{ii} + 2 \cdot \sum_{i=1}^{p-1} \sum_{j=i+1}^{p} a_{ij} b_{ij}.$$

5. A process according to claim 4 wherein the determining step uses the function:

$$\text{traceprod}(Y,X^{-1}) \cdot \text{traceprod}(X,Y^{-1}) = p^2 a/h.$$

6. An apparatus for measuring a resemblance between a plurality of sound samples, comprising:

a learning means, including:
  means for acoustically analyzing a reference sound sample using a $p^{th}$ order acoustical analysis to obtain a resultant vector signal of the reference sound sample;
  means for calculating a covariance matrix X of size p×p using the resultant vector signal of the reference sound sample;
  means for inverting said covariance matrix X to obtain an inverted covariance matrix $X^{-1}$; and
  means for storing the inverted covariance matrix $X^{-1}$ in a dictionary;

a test means, including:
  means for acoustically analyzing a test sound sample using a $p^{th}$ order acoustical analysis to obtain a resultant vector signal of the test sound sample;
  means for calculating a covariance matrix Y of size p×p using the resultant vector signal of the test sound sample;
  means for multiplying the covariance matrix Y with the inverted covariance matrix $X^{-1}$ to obtain a product $YX^{-1}$;
  means for calculating p eigenvalues $\lambda k$ of $YX^{-1}$;
  means for determining a resemblance between the reference sound sample and the test sound sample using generalized sphericity functions using at least two of the following equations:

$$a(\lambda_1, \lambda_2, \ldots, \lambda_p) = \frac{1}{p} \sum_{k=1}^{p} \lambda_k$$

$$g(\lambda_1, \lambda_2, \ldots, \lambda_p) = \sqrt[p]{\prod_{k=1}^{p} \lambda_k}$$

$$h(\lambda_1, \lambda_2, \ldots, \lambda_p) = \left( \frac{1}{p} \sum_{k=1}^{p} \frac{1}{\lambda_k} \right)^{-1}$$

where a, g, and h represent respectively an arithmetic, geometric, and harmonic mean values of the eigenvalues $\lambda k$,
  wherein the learning means and test means each include respective:
  means for amplifying the sound samples;
  means for filtering the amplified sound samples; and
  means for digitizing the filtered amplified sound samples.

7. An apparatus according to claim 6, wherein the means for determining a resemblance uses the trace of the matrix $YX^{-1}$:

$$\sum_{k=1}^{p} \lambda_k = \text{trace}(YX^{-1})$$

the determinant of the matrix $YX^-$:

$$\prod_{k=1}^{p} \lambda_k = \det(YX^{-1})$$

and the trace of the inverted matrix $YX^-$:

$$\sum_{k=1}^{p} \frac{1}{\lambda_k} = \text{trace}(YX^{-1})$$

without having to explicitly calculate the eigenvalues $\lambda k$.

8. An apparatus according to claim 7, wherein:
  the learning means further comprises means for storing the covariance matrix X in the dictionary;
  the test means includes means for calculating the inverse matrix $Y^{-1}$; and
  the test means directly calculates the trace of a product of two symmetrical matrices A and B according to the equation:

$$\text{traceprod}(A,B) = \text{trace}(AB) = \sum_{i=1}^{p} \sum_{j=1}^{p} a_{ij}b_{ji} = \sum_{i=1}^{p} a_{ii}b_{ii} + 2 \cdot \sum_{i=1}^{p-1} \sum_{j=i+1}^{p} a_{ij}b_{ij}.$$

9. A process according to claim 8 wherein the determining means uses the function:

$$\text{traceprod}(Y,X^{-1}) \cdot \text{traceprod}(X,Y^{-1}) = p^2 a/h.$$

10. An apparatus for measuring the resemblance between sound samples, comprising:
  a digital acquisition and pre-processing module which converts an analog sound sample into a digital signal;
  an acoustic analysis module which transforms the digital signal into a vector signal composed of acoustic parameters;
  a covariance matrix module which computes a covariance of the acoustic vector signal at the output of the acoustic analysis module;
  a matrix inversion module for calculating the inverse of the symmetric matrix at the output of the covariance matrix module;
  a module for storing the output of the matrix inversion module in a dictionary, the storing module being only active during a training phase;
  a matrix multiplication module which takes during a test phase, the covariance matrix at the output of the covariance matrix module and multiplies it with an inverse covariance matrix from the dictionary, the matrix multiplication module being active only during the test phase;
  a module for extracting eigenvalues of the product obtained at the output of the matrix multiplication module, the extracting module being active only during the test phase; and
  a module for calculating a resemblance signal as a sphericity function of the eigenvalues produced by module using at least two of the following equations:

$$a(\lambda_1, \lambda_2, \ldots, \lambda_p) = \frac{1}{p} \sum_{k=1}^{p} \lambda_k$$

$$g(\lambda_1, \lambda_2, \ldots, \lambda_p) = \sqrt[p]{\prod_{k=1}^{p} \lambda_k}$$

-continued $$h(\lambda_1, \lambda_2, \ldots, \lambda_p) = \left( \frac{1}{p} \sum_{k=1}^{p} \frac{1}{\lambda_k} \right)^{-1}$$

where a, g, and h represent respectively an arithmetic, geometrical, and harmonic mean values of the eigenvalues $\lambda k$.

11. An apparatus according to claim 10, wherein the module for extracting the eigenvalues is replaced by at least two of the three following modules;

- a module for calculating a trace of the output of the matrix multiplication module, in parallel with;
- a module for calculating a determinant of the output of the matrix multiplication module, in parallel with;
- a module for inverting the output of the matrix multiplication module followed by a module for calculating the trace of the thus obtained matrix;

wherein the module for calculating a resemblance signal calculates the resemblance signal from outputs of at least two of the three modules including the module for calculating the trace of the matrix product, the module for calculating the determinant of the matrix product, and the module for calculating the trace of the inverted matrix product.

12. An apparatus according to claim 10, further comprising:

two modules and which compute in parallel the trace of the product of two matrices, wherein one of said two modules takes as input, the test covariance matrix at the output of the covariance matrix module and the inverse reference covariance matrix stored in the module for storing the output of the matrix inversion module, wherein the other of said two modules takes as input, the inverted test covariance matrix from the matrix inversion module and the reference covariance matrix which is also stored in the dictionary besides the inverse reference covariance matrix, a module which delivers the resemblance signal as the product of the output of said two modules.

\* \* \* \* \*